US010750283B2

(12) United States Patent
Fukue et al.

(10) Patent No.: US 10,750,283 B2
(45) Date of Patent: Aug. 18, 2020

(54) ACOUSTIC DEVICE AND ACOUSTIC CONTROL DEVICE

(71) Applicant: CLARION CO., LTD., Saitama (JP)

(72) Inventors: Kazutomo Fukue, Saitama (JP); Takeshi Hashimoto, Saitama (JP); Kenji Kono, Saitama (JP); Yasuhiro Fujita, Saitama (JP)

(73) Assignee: CLARION CO., LTD., Saitama (JP)

( * ) Notice: Subject to any disclaimer, the term of this patent is extended or adjusted under 35 U.S.C. 154(b) by 0 days.

(21) Appl. No.: 16/475,495

(22) PCT Filed: Jan. 31, 2018

(86) PCT No.: PCT/JP2018/003093

§ 371 (c)(1),
(2) Date: Jul. 2, 2019

(87) PCT Pub. No.: WO2018/143232

PCT Pub. Date: Aug. 9, 2018

(65) Prior Publication Data

US 2019/0342662 A1 Nov. 7, 2019

(30) Foreign Application Priority Data

Feb. 2, 2017 (JP) ................................ 2017-017912

(51) Int. Cl.
*H04R 3/04* (2006.01)
*H04R 1/20* (2006.01)
(Continued)

(52) U.S. Cl.
CPC ................ *H04R 3/04* (2013.01); *H04R 1/20* (2013.01); *H04R 29/001* (2013.01); *H04R 2227/007* (2013.01); *H04R 2499/13* (2013.01)

(58) Field of Classification Search
None
See application file for complete search history.

(56) References Cited

U.S. PATENT DOCUMENTS

2001/0026087 A1 10/2001 Tomita
2006/0050891 A1* 3/2006 Bharitkar ............ H04R 29/001
381/59

(Continued)

FOREIGN PATENT DOCUMENTS

JP 2001-285976 A 10/2001
JP 2013-172416 A 9/2013

(Continued)

OTHER PUBLICATIONS

International Preliminary Report on Patentability of PCT Application No. PCT/JP2018/003093 dated Aug. 15, 2019.

(Continued)

*Primary Examiner* — Qin Zhu
(74) *Attorney, Agent, or Firm* — IP Business Solutions, LLC

(57) ABSTRACT

Attenuation of output levels is suppressed while interference due to a plurality of vibrators is reduced.
An acoustic control device 30 performs correction processing of correcting phase delay characteristics including transmission systems from exciters 21L and 21R which are first and second vibrators connected with a rigid body, on acoustic signals SR and SL. Thereafter, the acoustic control device 30 controls the exciters 21L and 21R on the basis of the corrected acoustic signals SL1 and SR1.

5 Claims, 10 Drawing Sheets

(51) Int. Cl.

| | |
|---|---|
| ***H04R 29/00*** | (2006.01) |
| ***H04R 1/24*** | (2006.01) |
| ***H04S 7/00*** | (2006.01) |

(56) References Cited

U.S. PATENT DOCUMENTS

2007/0127738 A1* 6/2007 Yamada .................... H04R 3/04 381/98
2009/0257616 A1* 10/2009 Kaneda .................... H04R 1/26 381/389
2014/0112503 A1* 4/2014 Hebenstreit .............. H04R 1/00 381/151
2015/0139443 A1* 5/2015 Okimoto ................. H04S 1/002 381/86
2015/0201260 A1* 7/2015 Oswald .................. H04R 1/025 381/86
2016/0134985 A1* 5/2016 Hashimoto ............. H04S 7/302 704/503
2017/0064421 A1* 3/2017 Matsumura ............ H04R 1/025
2018/0122356 A1* 5/2018 Yoo .......................... B60R 13/08
2019/0082264 A1* 3/2019 Kang ................. G02B 27/0176

FOREIGN PATENT DOCUMENTS

JP 2016-19064 A 2/2016
JP 2018-6954 A 1/2018

OTHER PUBLICATIONS

Written Opinion of the International Searching Authority of PCT Application No. PCT/JP2018/003093 dated Apr. 24, 2018.
International Search Report for corresponding International Patent Application No. PCT/JP2018/003093 dated Apr. 24, 2018.
Written Opinion for corresponding International Patent Application No. PCT/JP2018/003093 dated Apr. 24, 2018.

* cited by examiner

ACOUSTIC DEVICE AND ACOUSTIC CONTROL DEVICE

TECHNICAL FIELD

The present invention relates to an acoustic device and an acoustic control device.

BACKGROUND ART

As an acoustic device using two exciters, a device described in Patent Literature 1 is disclosed. In Patent Literature 1, the exciters are respectively fixed on facing surfaces of a cylindrical body, and one exciter is caused to vibrate on the basis of a signal obtained by inverting only a phase of a frequency component in which a standing wave occurs in a first acoustic signal. Furthermore, the other exciter is caused to vibrate on the basis of a signal obtained by inverting only a phase of a frequency component in which a standing wave occurs in a second acoustic signal.

CITATION LIST

Patent Literatures

[Patent Literature 1] Japanese Patent Laid-Open No. 2013-172416

SUMMARY OF INVENTION

Technical Problem

However, because, in a conventional configuration, a standing wave is suppressed by a phase being inverted in a specific frequency band, the conventional configuration contradicts improvement of output levels of sound and vibration. Furthermore, in the conventional configuration, a band-pass filter which allows a frequency band in which a standing wave occurs to pass, and a band-rejection filter which blocks the frequency band are used. Therefore, there is a possibility that output levels of output signals of respective channels attenuate around low cutoff frequencies and around high cutoff frequencies of the respective filters.

Therefore, an object of the present invention is to suppress attenuation of output levels while reducing interference due to a plurality of vibrators.

Solution to Problem

The entire content of Japanese Patent Application No. 2017-017912 filed on Feb. 2, 2017 is incorporated into the present specification.

To achieve the above-described object, an acoustic device according to an aspect of the present invention includes a first vibrator, a second vibrator, a rigid body connecting the first vibrator and the second vibrator, a member to be vibrated through which the rigid body passes, an acquiring unit configured to acquire an acoustic signal, and a control unit configured to perform correction processing of correcting a phase delay characteristic including transmission systems from the first vibrator and the second vibrator on the acoustic signal and control the first vibrator and the second vibrator on the basis of the corrected acoustic signal.

In the above-described configuration, the control unit may perform the correction processing on a signal which is in a low frequency band and which is a monaural component among the acoustic signal.

In the above-described configuration, the control unit may include a separating unit configured to separate the acoustic signal into the signal which is in the low frequency band and which is the monaural component and other signals, and an adding unit configured to add the signal subjected to the correction processing and the other signals, and may control the first vibrator and the second vibrator on the basis of a signal obtained by the addition.

Furthermore, in the above-described configuration, the acoustic signal may include a signal of a first channel corresponding to the first vibrator and a signal of a second channel corresponding to the second vibrator, the control unit may include an acoustic measuring unit configured to acquire respective impulse responses of the first vibrator and the second vibrator at predetermined positions and acquire correction information for the first channel and correction information for the second channel for correcting the phase delay characteristic on the basis of the respective impulse responses, and may correct the signal of the first channel on the basis of the correction information for the first channel and correct the signal of the second channel on the basis of the correction information for the second channel as the correction processing.

Furthermore, according to an aspect of the present invention, an acoustic control device which controls a vibration unit including a first vibrator, a second vibrator, a rigid body connecting the first vibrator and the second vibrator, and a member to be vibrated through which the rigid body passes, includes an acquiring unit configured to acquire an acoustic signal, and a control unit configured to perform correction processing of correcting a phase delay characteristic including transmission systems from the first vibrator and the second vibrator on the acoustic signal and control the first vibrator and the second vibrator on the basis of the corrected acoustic signal.

Advantageous Effects of Invention

In aspects of the present invention, correction processing of correcting phase delay characteristics including transmission systems from a first vibrator and a second vibrator connected with a rigid body is performed on an acoustic signal, and the first vibrator and the second vibrator are controlled on the basis of the corrected acoustic signal. By this means, it is possible to suppress attenuation of output levels while reducing interference.

DESCRIPTION OF EMBODIMENT

An embodiment of the present invention will be described below with reference to the drawings.

Figure 1:
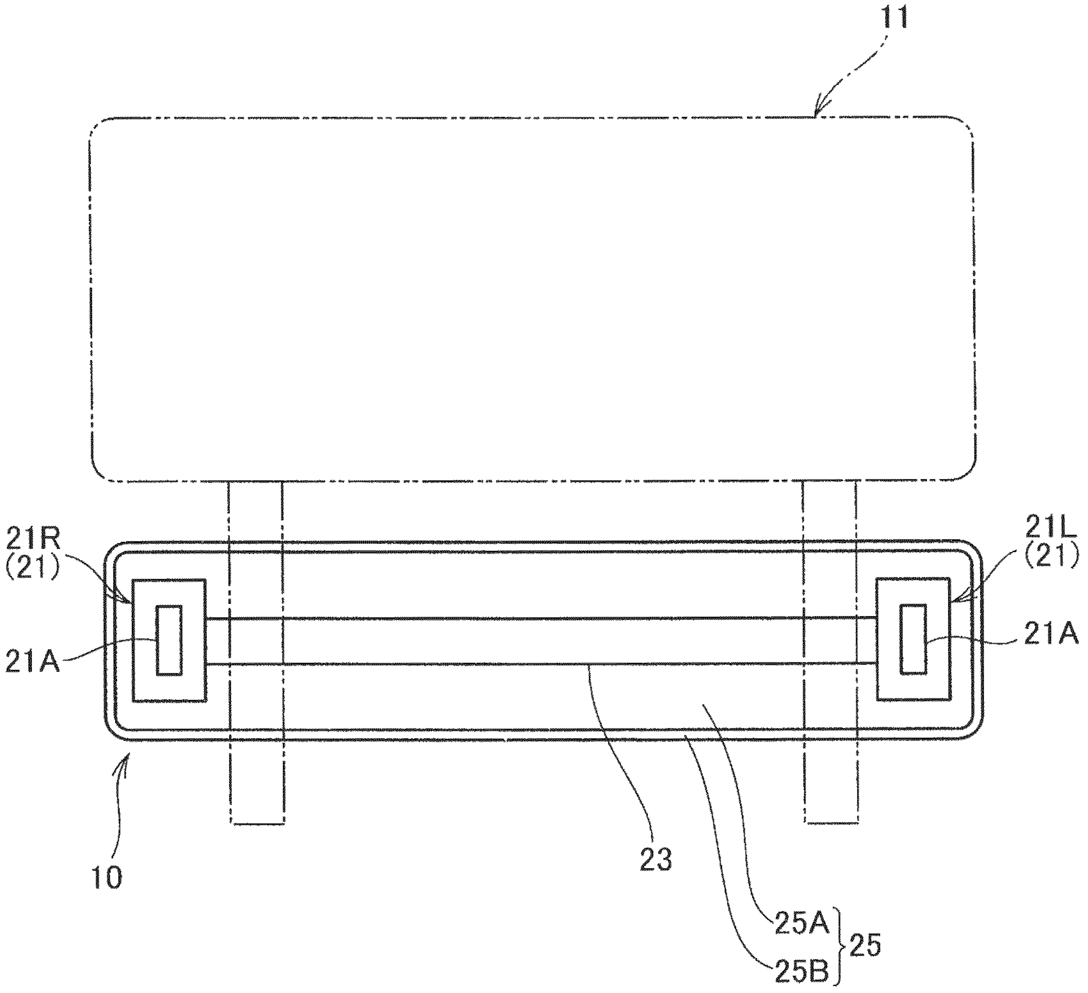
FIG. 1 is a diagram illustrating an acoustic device according to an embodiment of the present invention along with peripheral components.

FIG. 1 is a diagram illustrating an acoustic device 10 according to an embodiment of the present invention along with peripheral components.

The acoustic device 10 is an in-vehicle acoustic device mounted on a vehicle such as a car. More specifically, this acoustic device 10 is an in-vehicle information transmitting device which can transmit various kinds of information such as music, speech guidance, vibration and sound for alarm to a passenger (user) of the vehicle through vibration and sound.

As illustrated in FIG. 1, the acoustic device 10 is detachably attached to a lower part of a headrest 11, and also functions as a neck pad which supports a neck of the passenger. By this acoustic device 10 being attached, it is possible to easily add an information transmitting device to a vehicle in which this kind of information transmitting device is not provided in advance. Note that this acoustic device 10 may be of a built-in type, which is built in the vehicle in advance. Furthermore, the acoustic device 10 may be attached to a mobile body, or the like, other than the vehicle.

This acoustic device 10 includes a pair of left and right exciters 21L and 21R which function as a first vibrator and a second vibrator, and an axial member 23 which functions as a connecting body (rigid body) connecting these exciters 21L and 21R. Furthermore, the acoustic device 10 includes a pad portion 25 which functions as a neck pad at which the axial member 23 is mounted and a member to be vibrated, and an acoustic control device 30 (FIG. 2 which will be described later) which functions as a control unit controlling the exciters 21L and 21R.

The exciters 21L and 21R include vibrators 21A formed in a thin shape such as a plate, and the exciters 21L and 21R wholly respectively vibrate by the vibrators 21A vibrating in accordance with a signal input from outside. The axial member 23 is made to vibrate by the vibration of the respective exciters 21L and 21R. The axial member 23 transmits vibration to the passenger via the pad portion 25 mounted at this axial member 23. By this means, the passenger easily recognizes particularly low-pitched vibration and low-pitched sound via the pad portion 25.

The exciters 21L and 21R of the present configuration further include an air vibration member (for example, a speaker diaphragm) which causes air to vibrate and which is not illustrated, and the air vibration member vibrates in accordance with vibration of the vibrator 21A. By this means, it is possible to output sound in a wider range to outside than that in a case of the axial member 23 alone. A structure of the exciters 21L and 21R is not limited to the above-described structure, and a publicly known structure of the exciter can be widely applied.

The respective exciters 21L and 21R are disposed at intervals in a lateral direction within the vehicle. The left exciter 21L is an exciter for an L channel, and the right exciter 21R is an exciter for an R channel. Hereinafter, the left and right exciters 21L and 21R will be expressed as an exciter 21 unless it is necessary to particularly distinguish the exciters.

One end of the axial member 23 is connected to one exciter 21L and the other end is connected to the other exciter 21R. The axial member 23 is a metal solid-core rod extending in a linear manner. By the two exciters 21 being connected with the axial member 23 which has rigidity, in the case where directions of vibration of the axial member 23 by vibration of the both exciters 21 are aligned, a vibration amount (amplitude) of the axial member 23 increases, and vibration efficiently increases.

This axial member 23 is not limited to a metal solid-core rod, and various rigid bodies can be applied. For example, the axial member 23 may be a metal hollow rod or a metal plate material, or may be formed with a material other than a metal. Furthermore, the number of axial members 23 is not limited to one, and there may be a plurality of axial members 23.

The pad portion 25 constitutes a neck pad which is an abutting portion abutting on the passenger, and includes a cushion portion 25A formed with a cushion material such as urethane and a surface skin 25B which covers the cushion portion 25A. The axial member 23 passes through inside (cushion portion 25A) of this pad portion 25 and causes the whole pad portion 25 to vibrate by vibration of the axial member 23. By this means, the axial member 23 vibrates by vibration of the respective exciters 21, and vibration, or the like, can be transmitted to the passenger through the pad portion 25. This pad portion 25 is also used as a case which accommodates the exciters 21, the axial member 23, or the like.

Figure 2:
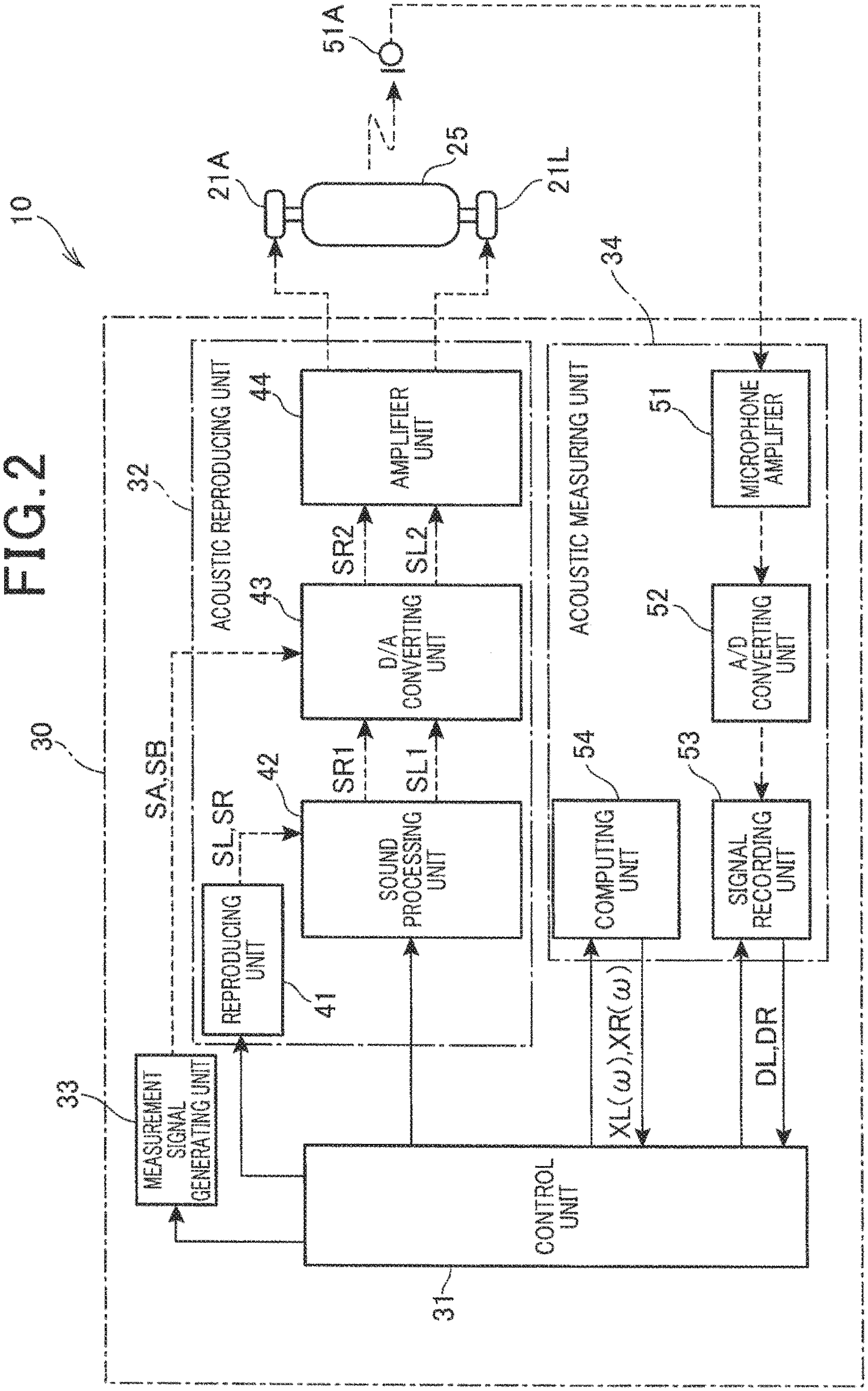
FIG. 2 is a block diagram of the acoustic device.

FIG. 2 is a block diagram of the acoustic device 10.

The acoustic control device (hereinafter, referred to as a control device) 30 includes a control unit 31 and an acoustic reproducing unit 32. The control unit 31 functions as a computer which controls each component of the control device 30 by executing a control program recorded in a built-in memory.

The acoustic reproducing unit 32 has a configuration for reproducing an acoustic signal, and includes a reproducing unit 41, a sound processing unit 42, a D/A converting unit 43 and an amplifier unit 44. The reproducing unit 41 functions as an acquiring unit which acquires acoustic signals SR and SL of an L/R channel (also referred to as a dual channel) to be reproduced.

The reproducing unit 41 reads out data recorded in a recording medium such as a CD and a DVD, and outputs an acoustic signal SL of an L channel and an acoustic signal SR of an R channel obtained from this data. Note that, in place of the reproducing unit 41, or in addition to the reproducing unit 41, an interface for inputting the acoustic signals SR and SL from outside may be provided.

The acoustic signals SR and SL are signals representing music, speech guidance, sound and vibration corresponding to alarm, or the like, and, in the present embodiment, are stereo (L, R) sound signals. Therefore, by the acoustic signal SL of the L channel being output to the exciter 21L for the L channel, and the acoustic signal SR of the R channel being output to the exciter 21R for the R channel, it is possible to output stereo sound. Note that a wavy line in FIG. 2 indicates a sound signal.

The sound processing unit 42 performs sound processing such as phase correction on the input acoustic signals SL and SR and outputs the signals to the D/A converting unit 43. In the present configuration, processing of correcting a phase delay of a signal of a monaural component is performed in a low frequency band including a piston motion region. This processing performed at the sound processing unit 42 will be described in detail later.

The D/A converting unit 43 performs digital to analog conversion on the input acoustic signals SL1 and SR1 and outputs the acoustic signals SL2 and SR2 which are analog signals.

The amplifier unit 44 amplifies the acoustic signal SL2 of the L channel and outputs the amplified signal to the exciter 21L, and amplifies the acoustic signal SR2 of the R channel and outputs the amplified signal to the exciter 21R. The respective exciters 21 vibrate in accordance with waveforms of the input acoustic signals SL2 and SR2. In this manner, the control device 30 performs phase delay correction processing, or the like, on the input signals (acoustic signals SL and SR) to generate acoustic signals SR2 and SL2, and drives the respective exciters 21 on the basis of the acoustic signals SL2 and SR2.

Furthermore, the control device 30 has a configuration of measuring phase delay characteristics including transmission systems from the respective exciters 21. This configuration includes a measurement signal generating unit 33 and an acoustic measuring unit 34.

The measurement signal generating unit 33 is a sound source which outputs a measurement signal, and generates an L channel measurement signal SA and an R channel measurement signal SB as a sound field measurement signal such as a signal of a Maximum Length Sequence (M-sequence signal) and a TSP (Time Stretched Pulse) signal. These sound field measurement signals (hereinafter, referred to as measurement signals) SA and SB are output to the D/A converting unit 43, and sound and vibration corresponding to the respective measurement signals SA and SB are output from the respective exciters 21.

The acoustic measuring unit 34 includes a microphone amplifier 51, an A/D converting unit 52, a signal recording unit 53 and a computing unit 54. The microphone amplifier 51 amplifies an analog sound signal representing sound collected by a microphone 51A connected to the control device 30 and outputs the amplified analog sound signal to the A/D converting unit 52. The A/D converting unit 52 converts the analog sound signal into a digital sound signal and outputs the digital sound signal to the signal recording unit 53. The signal recording unit 53 generates data DL and DR representing impulse responses from the digital sound signal of the recorded sound. The data DL and DR of the impulse responses is recorded in a memory within the control unit 31.

The impulse responses are transfer functions representing behavior (such as a level and delay time of direct sound and reflected sound) of sound reaching a listening position (corresponding to a position of the microphone 51A) from the respective exciters 21. Therefore, the impulse responses represent phase delay characteristics of sound arriving at the listening position in a vehicle interior which becomes transmission space. Note that a head position, or the like, of the passenger who listens to sound from the acoustic device 10 is set as the listening position.

The computing unit 54 calculates responses (hereinafter, referred to as correction responses) XL(ω) and XR(ω) for correcting the phase delay characteristics represented by the respective pieces of data DL and DR on the basis of the data DL and DR of the impulse responses. A calculation method of the correction responses XL(ω) and XR(ω) will be described later. Note that the value C is a frequency.

The control unit 31 executes acoustic measurement processing and correction response calculation processing in accordance with an instruction from the user.

Figure 3:
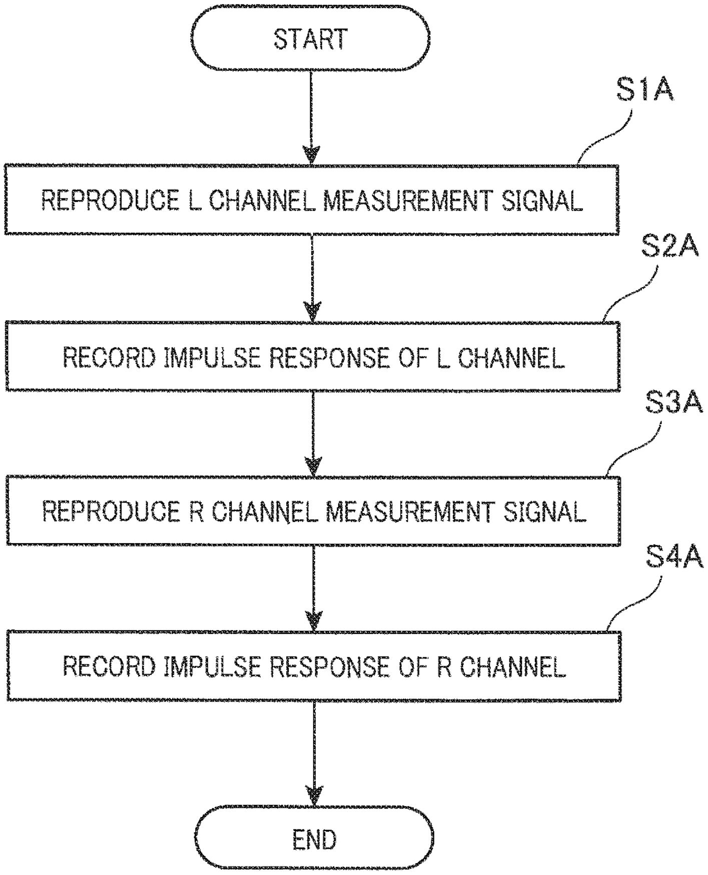
FIG. 3 is a flowchart of acoustic measurement processing.

FIG. 3 is a flowchart of the acoustic measurement processing.

First, the control unit 31 causes sound of the L channel measurement signal SA to be emitted (also referred to as reproduced) from the exciter 21L by the measurement signal generating unit 33 (step S1A). The emitted sound is collected at the microphone 51A, amplified at the microphone amplifier 51, and input to the signal recording unit 53 via the A/D converting unit 52. The signal recording unit 53 generates an impulse response on the basis of the input signal and outputs the data DL corresponding to the impulse response to the control unit 31. The control unit 31 then records this data DL (step S2A).

The control unit 31 then causes sound of the R channel measurement signal SB to be emitted (reproduced) from the exciter 21R by the measurement signal generating unit 33 (step S3A), and records the data DR of the impulse response generated at the signal recording unit 53 (step S4A). The above is the sound field measurement processing.

Figure 4:
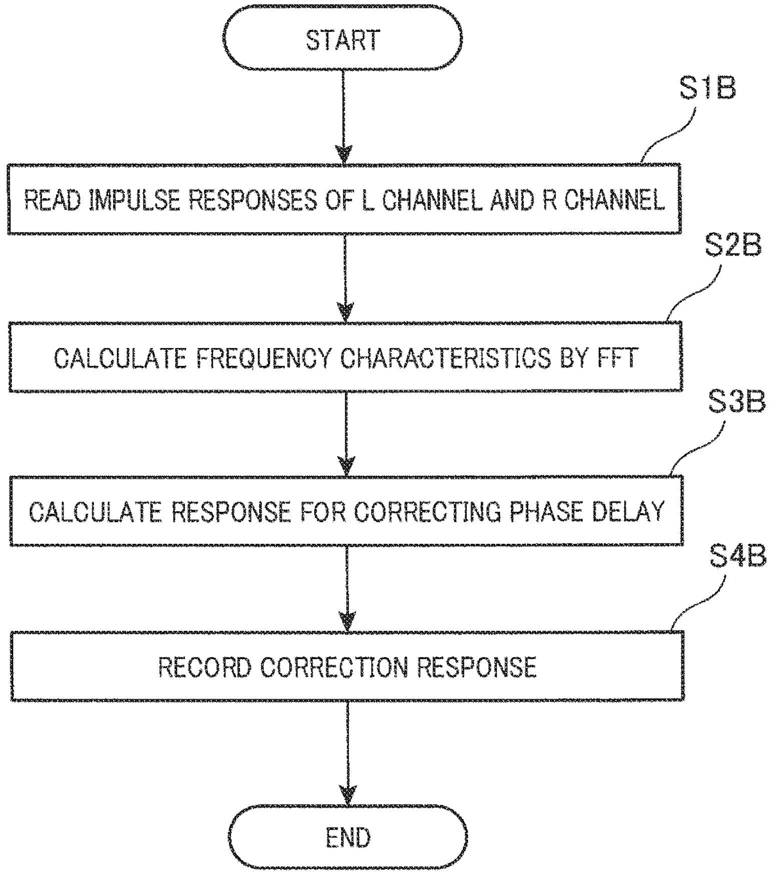
FIG. 4 is a flowchart of correction response calculation processing.

FIG. 4 is a flowchart of the correction response calculation processing.

The computing unit 54 reads the data DL and DR of the impulse responses stored in the control unit 31 under control by the control unit 31 (step SIB). The computing unit 54 then calculates respective frequency characteristics HL(ω) and HR(ω) by performing FFT (Fast Fourier Transform) on the respective impulse responses (step S2B). The computing unit 54 then calculates correction responses XR(ω) and XL(ω) for correcting the phase delay characteristics including transmission systems from the respective exciters 21 from the respective frequency characteristics HL(ω) and HR(ω) (step S3B). Equation (1) and equation (2) for calculating the correction responses XL(ω) and XR(ω) are as follows.

[Expression 1]

$$XL\left(\frac{2\pi k}{N}\right) = \begin{cases} e^{j\cdot\angle\frac{HR\left(\frac{2\pi k}{N}\right)}{HL\left(\frac{2\pi k}{N}\right)}} \begin{pmatrix} \tau L\left(\frac{2\pi k}{N}\right) < \tau R\left(\frac{2\pi k}{N}\right), \\ k = 0, 1, \ldots, \frac{N}{2} \end{pmatrix} \\ e^{j\cdot\angle\frac{HR\left(\frac{2\pi K}{N}\right)}{HL\left(\frac{2\pi k}{N}\right)}} \begin{pmatrix} \tau L\left(\frac{2\pi(k-2(l-1))}{N}\right) < \tau R\left(\frac{2\pi(k-2(l-1))}{N}\right), \\ k = \frac{N}{2}+2, \frac{N}{2}+3, \ldots, N \\ l = 2, 3, \ldots, \frac{N}{2} \\ 1 \quad (\text{otherwise}) \end{pmatrix} \end{cases} \quad \text{Equation (1)}$$

[Expression 2]

$$\begin{cases} e^{j\cdot\angle\frac{HL\left(\frac{2\pi k}{N}\right)}{HR\left(\frac{2\pi k}{N}\right)}} \begin{pmatrix} \tau L\left(\frac{2\pi k}{N}\right) < \tau R\left(\frac{2\pi k}{N}\right), \\ k = 0, 1, \ldots, \frac{N}{2} \end{pmatrix} \\ e^{j\cdot\angle\frac{HL\left(\frac{2\pi K}{N}\right)}{HR\left(\frac{2\pi k}{N}\right)}} \begin{pmatrix} \tau L\left(\frac{2\pi(k-2(l-1))}{N}\right) < \tau R\left(\frac{2\pi(k-2(l-1))}{N}\right), \\ k = \frac{N}{2}+2, \frac{N}{2}+3, \ldots, N \\ l = 2, 3, \ldots, \frac{N}{2} \\ 1 \quad (\text{otherwise}) \end{pmatrix} \end{cases} \quad \text{Equation (2)}$$

Note that a value N is an FFT length (sampling number), and a value ω of the frequency=2πk. The HL(ω) represents frequency characteristics of the L channel, and the HR(ω) represents frequency characteristics of the R channel. Furthermore, τL(ω) represents a phase delay of the impulse response of the L channel, and τR(ω) represents a phase delay of the impulse response of the R channel.

The control unit 31 then acquires the correction responses XL(ω) and XR(ω) calculated by the computing unit 54 and records the correction responses XL(ω) and XR(ω) in an internal memory (step S4B).

Subsequently, the sound processing unit 42 will be described.

Figure 5:
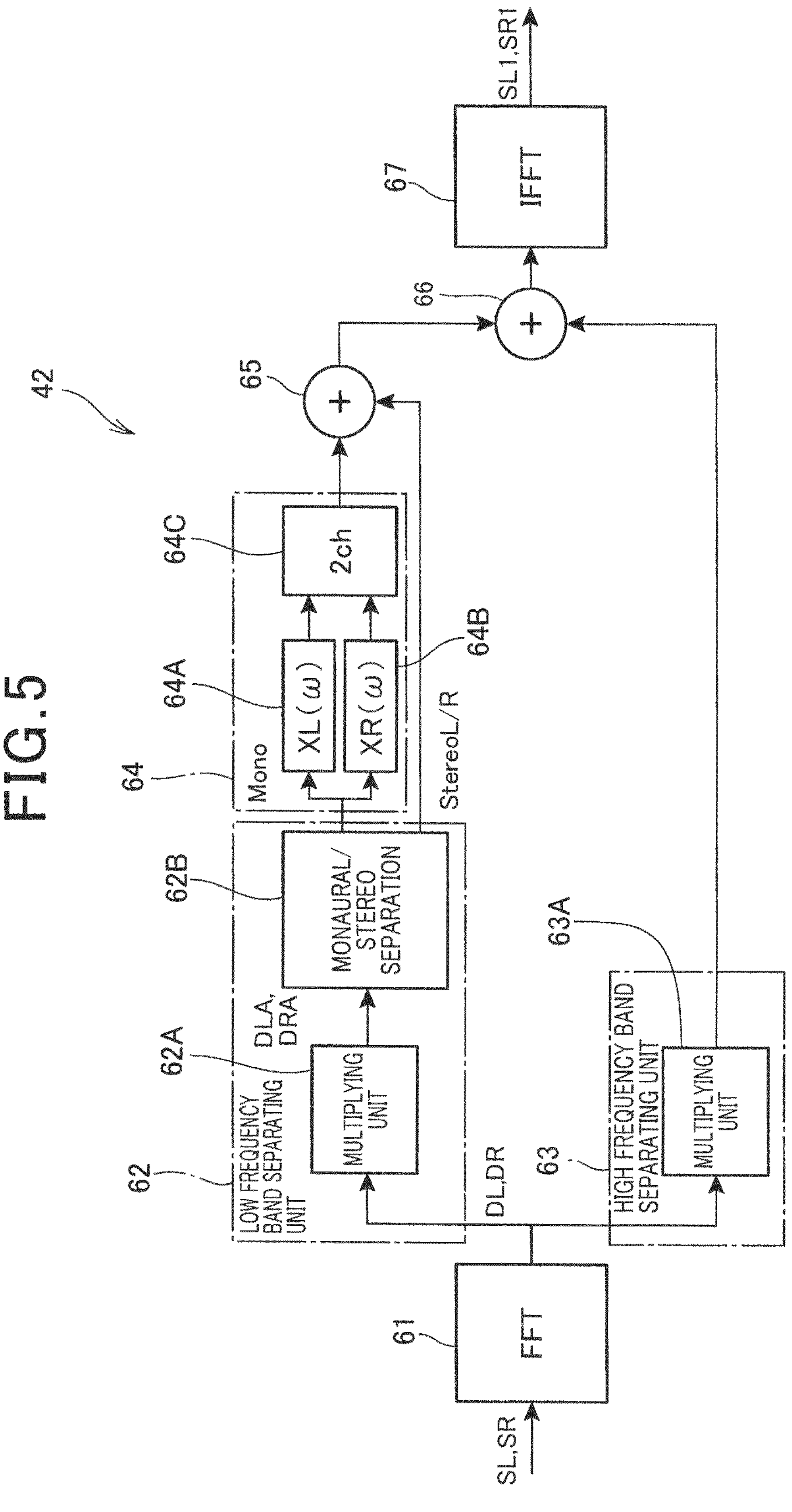
FIG. 5 is a block diagram of a sound processing unit.

FIG. 5 is a block diagram of the sound processing unit 42.

The sound processing unit 42 includes an FFT unit 61, a low frequency band separating unit 62, a high frequency band separating unit 63, a phase delay correcting unit 64, synthesizing units 65 and 66, and an IFFT unit 67.

The FFT unit 61 respectively converts information in a time domain into information in a frequency domain by performing fast Fourier transform on the input acoustic signals SR and SL. The low frequency band separating unit 62 includes a multiplying unit 62A, and a monaural/stereo separating unit 62B. The multiplying unit 62A performs convolution operation on a response of a low-pass filter, which has a linear phase, to the digital data DL and DR of the L/R channel which is a signal input from the FFT unit 61 to extract a low frequency component. This low frequency component is a frequency band of a piston motion region. In the present invention, the low frequency component is not limited to less than 100 Hz which is typically called a low frequency band, and may be appropriately set in a range of less than 2 kHz including a mid-frequency.

The monaural/stereo separating unit 62B separates the low frequency component separated by the multiplying unit 62A into a monaural component (in FIG. 5, indicated as "Mono") and a stereo component (in FIG. 5, indicated as "Stereo L/R"), and outputs the separated components to the phase delay correcting unit 64. Note that the monaural/stereo separating unit 62B may employ an addition scheme or may perform processing of separating an amplitude and a phase using a threshold.

The high frequency band separating unit 63 includes a multiplying unit 63A. The multiplying unit 63A performs convolution operation on the response of a high-pass filter which has a linear phase, to the signal (digital data DL and DR) input from the FFT unit 61 to extract a high frequency component. This high frequency component is a frequency component except the low frequency component extracted at the low frequency band separating unit 62. That is, the respective acoustic signals SR and SL are separated into a low frequency band component and a high frequency band component by the low frequency band separating unit 62 and the high frequency band separating unit 63.

The phase delay correcting unit 64 performs correction processing of correcting the phase delay characteristics on a signal which is in a low frequency band, which is a monaural component (in FIG. 5, "Mono"), and which is separated by the low frequency band separating unit 62. More specifically, the phase delay correcting unit 64 includes a multiplying unit (hereinafter, referred to as a first multiplying unit) 64A which performs convolution operation on the correction response XL(ω) to the above-described signal (in FIG. 5, "Mono") and a multiplying unit (hereinafter, referred to as a second multiplying unit) 64B which performs convolution operation on the correction response XR(ω) to the above-described signal (in FIG. 5, "Mono"). Furthermore, the phase delay correcting unit 64 includes a 2ch unit 64C which makes output of these multiplying units 64A and 64B dual output of the L/R channel.

The synthesizing unit (hereinafter, referred to as a first synthesizing unit) 65 synthesizes the signal output from the 2ch unit 64C and the stereo component (in FIG. 5, "Stereo L/R") separated at the monaural/stereo separating unit 62B to generate a low frequency band signal of the L/R channel. Furthermore, the synthesizing unit (hereinafter, referred to as a second synthesizing unit) 66 located subsequent to the first synthesizing unit 65 synthesizes the signal output from the first synthesizing unit 65 and the signal output from the high frequency band separating unit 63.

The IFFT unit 67 respectively converts information in the frequency domain into information in the time domain by performing inverse fast Fourier transform on a signal of the L/R channel output from the second synthesizing unit 66. By this means, the acoustic signals SL1 and SR1 obtained by performing correction processing of correcting the phase delay characteristics including transmission systems on the acoustic signals SR and SL of the L/R channel are generated.

Figure 6:
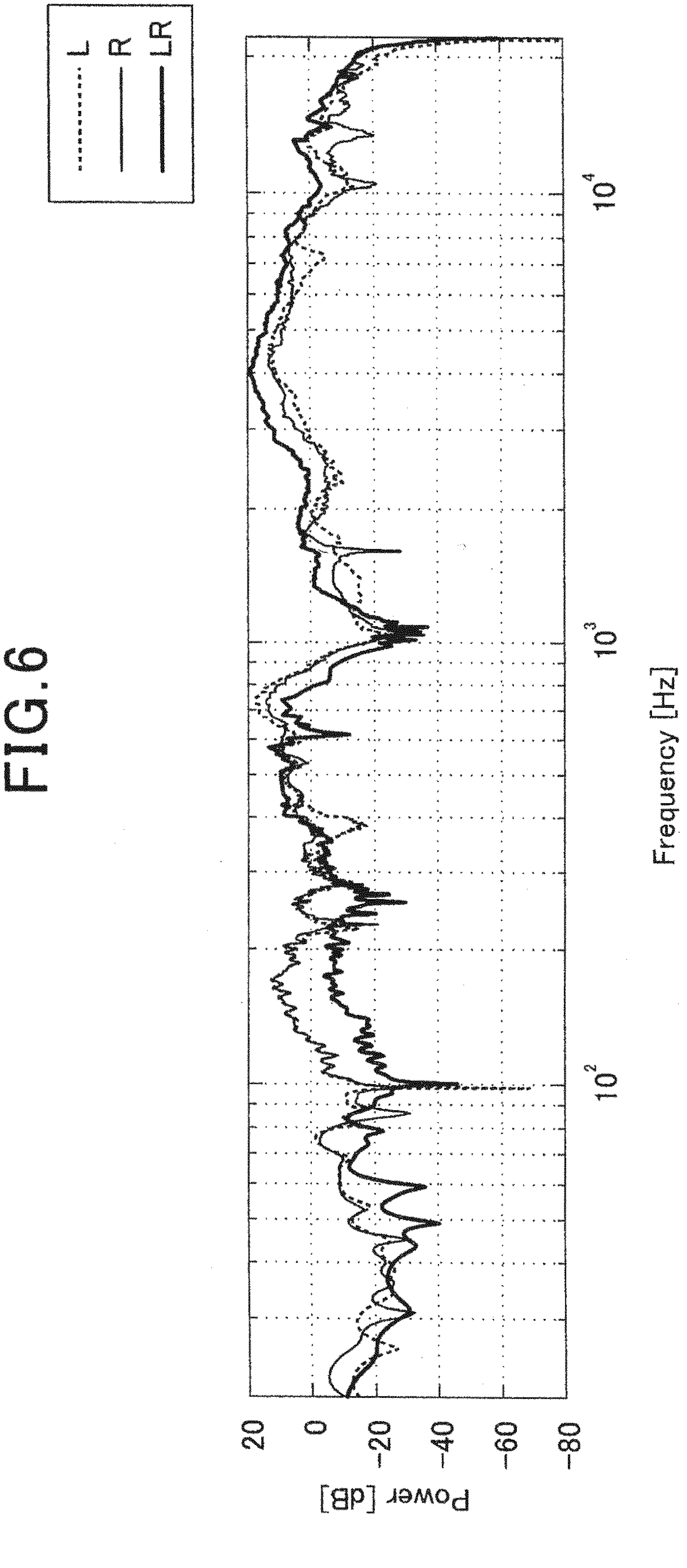
FIG. 6 is a diagram illustrating amplitude characteristics in the case where sound processing is not performed at the sound processing unit.

FIG. 6 is a diagram illustrating amplitude characteristics in the case where sound processing is not performed at the sound processing unit 42, and indicates a frequency (Hz) on a horizontal axis and indicates a volume (dB) on a vertical axis. FIG. 6 illustrates an acoustic measurement result (in FIG. 6, a sign L) in the case where a monaural signal is output from the L channel, an acoustic measurement result (in FIG. 6, a sign R) in the case where a monaural signal is output from the R channel, and an acoustic measurement result (in FIG. 6, a sign LR) in the case where a monaural signal is output from the L/R channel.

In the example in FIG. 6, a characteristic curve LR largely attenuates in a low frequency band (indicated with a sign AR1) and in a mid-frequency band (indicated with a sign AR2). That is, it indicates that interference occurs in a piston motion region of the exciters 21L and 21R.

Figure 7:
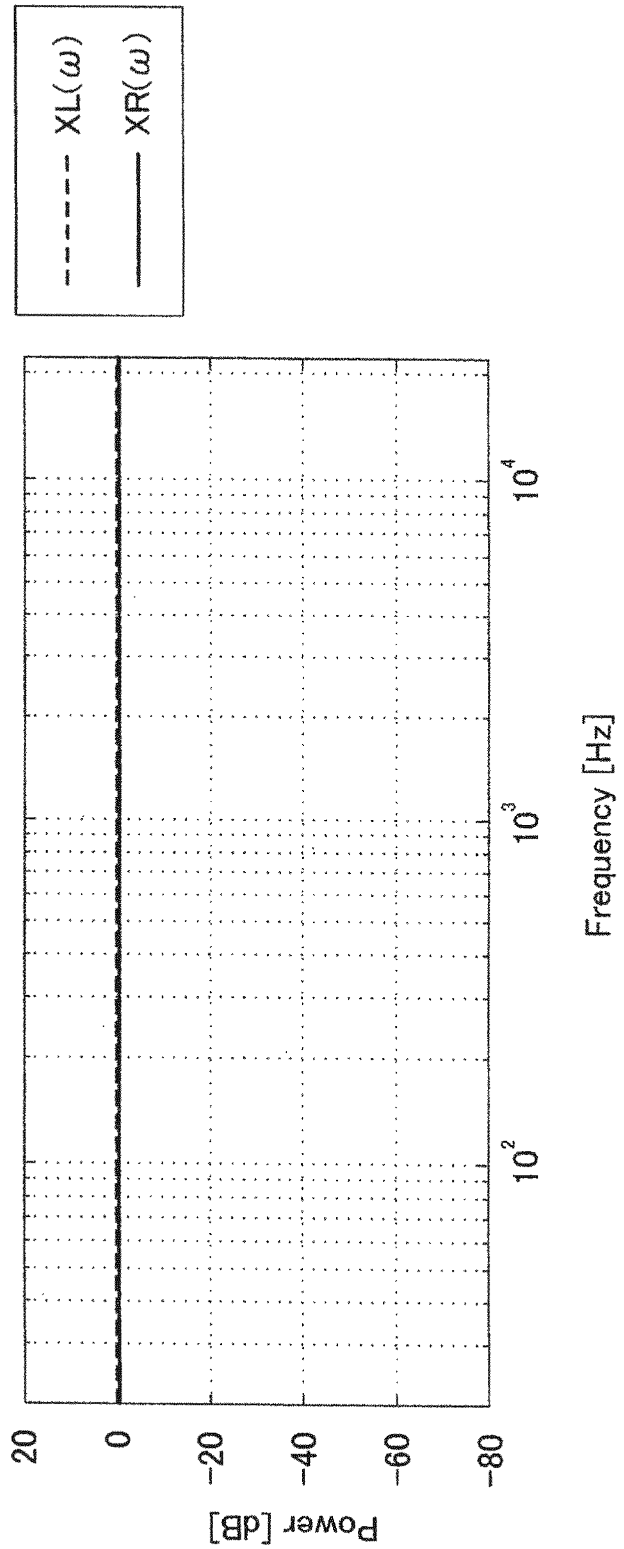
FIG. 7 is a diagram illustrating relationship between frequencies of correction responses and a volume.

FIG. 7 is a diagram illustrating relationship between frequencies of the correction responses XL(ω) and XR(ω) and a volume. As illustrated in FIG. 7, the correction responses XL(ω) and XR(ω) have characteristics of an all-pass filter.

Figure 8:
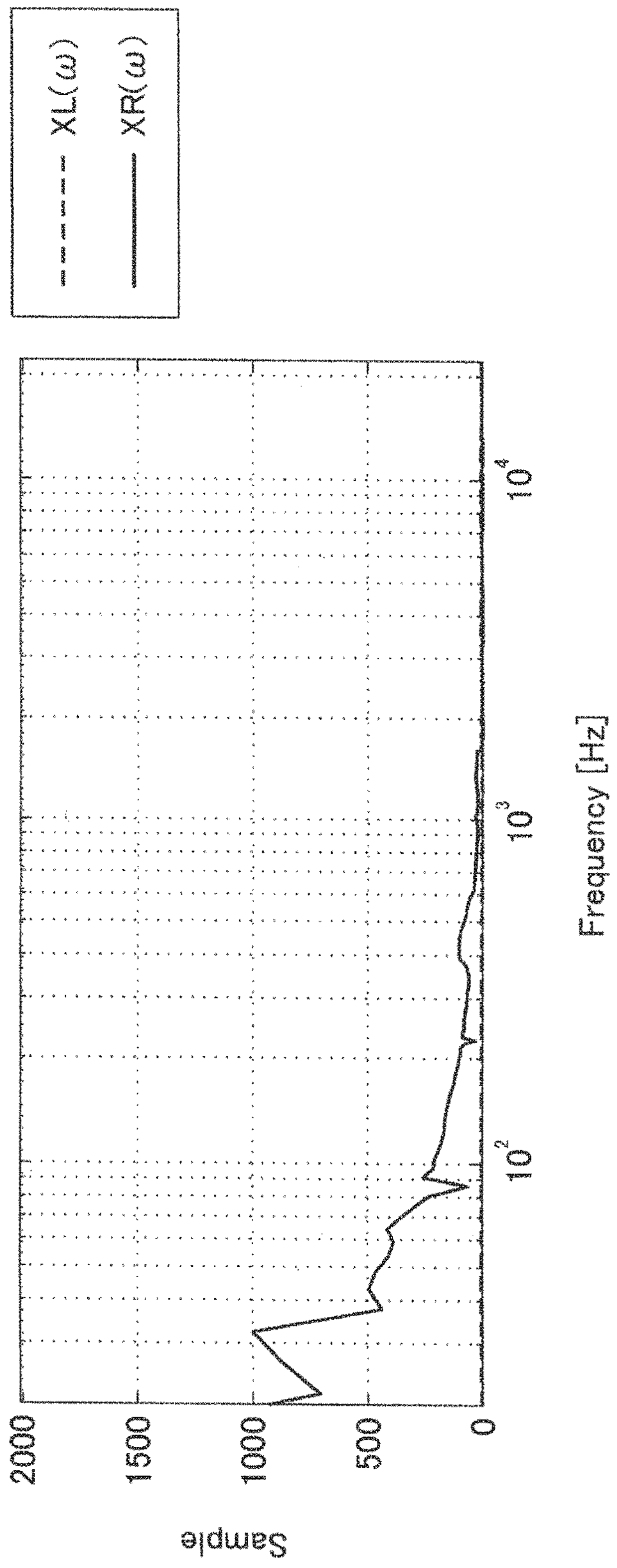
FIG. 8 is a diagram illustrating relationship between frequencies of correction responses and a delay amount.

FIG. 8 is a diagram illustrating relationship between frequencies of the correction responses XL(ω) and XR(ω) and a delay amount, and indicates a sampling number corresponding to the delay amount on the vertical axis. As the correction responses XL(ω) and XR(ω), a linear phase low-pass filter having a cutoff frequency of 1600 Hz and a high-pass filter are used while the piston motion region is taken into account.

In FIG. 8, the correction response XR(ω) represents a case of characteristics in which the delay amount is corrected in a range between 20 and 1600 Hz, and the correction response XL(ω) represents a case of characteristics in which the phase delay amount becomes substantially zero.

Figure 9:
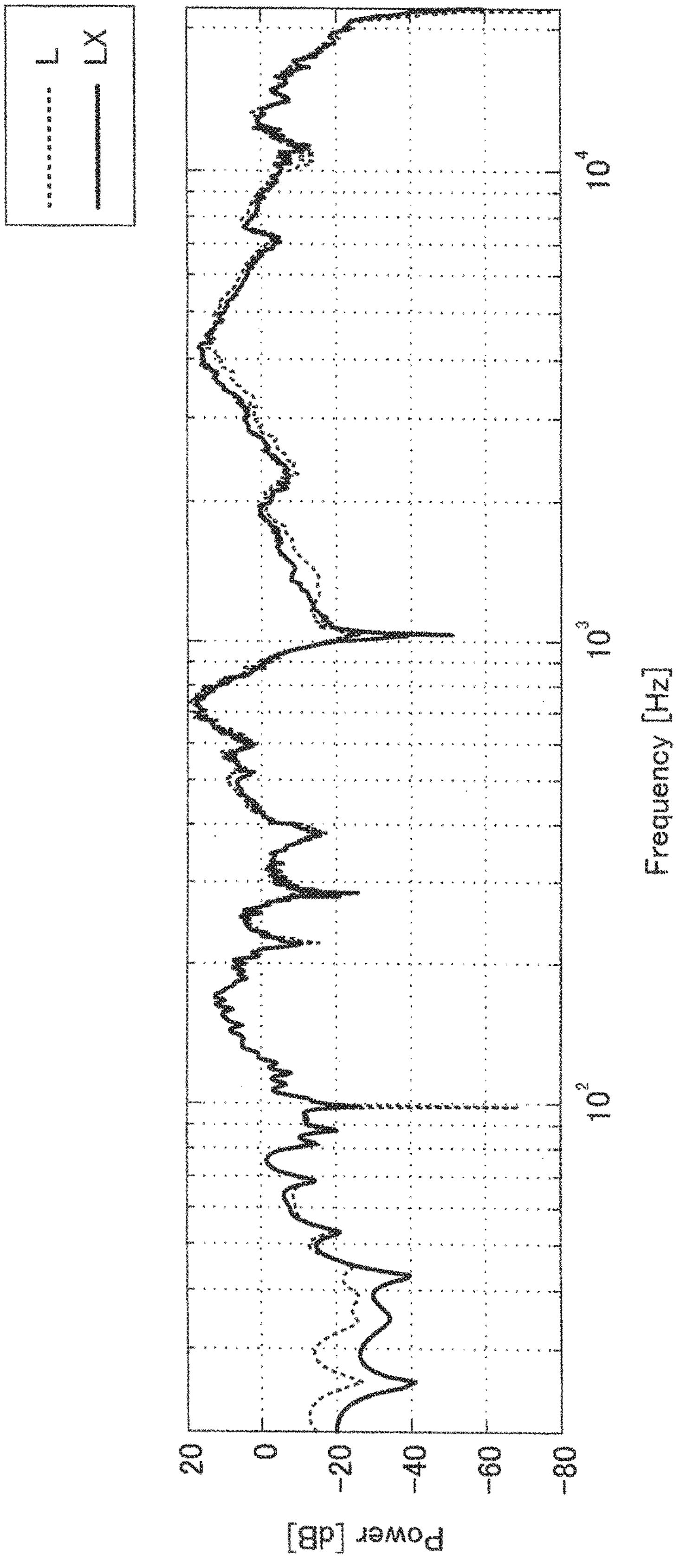
FIG. 9 is a diagram illustrating an acoustic measurement result of an L channel.
Figure 10:
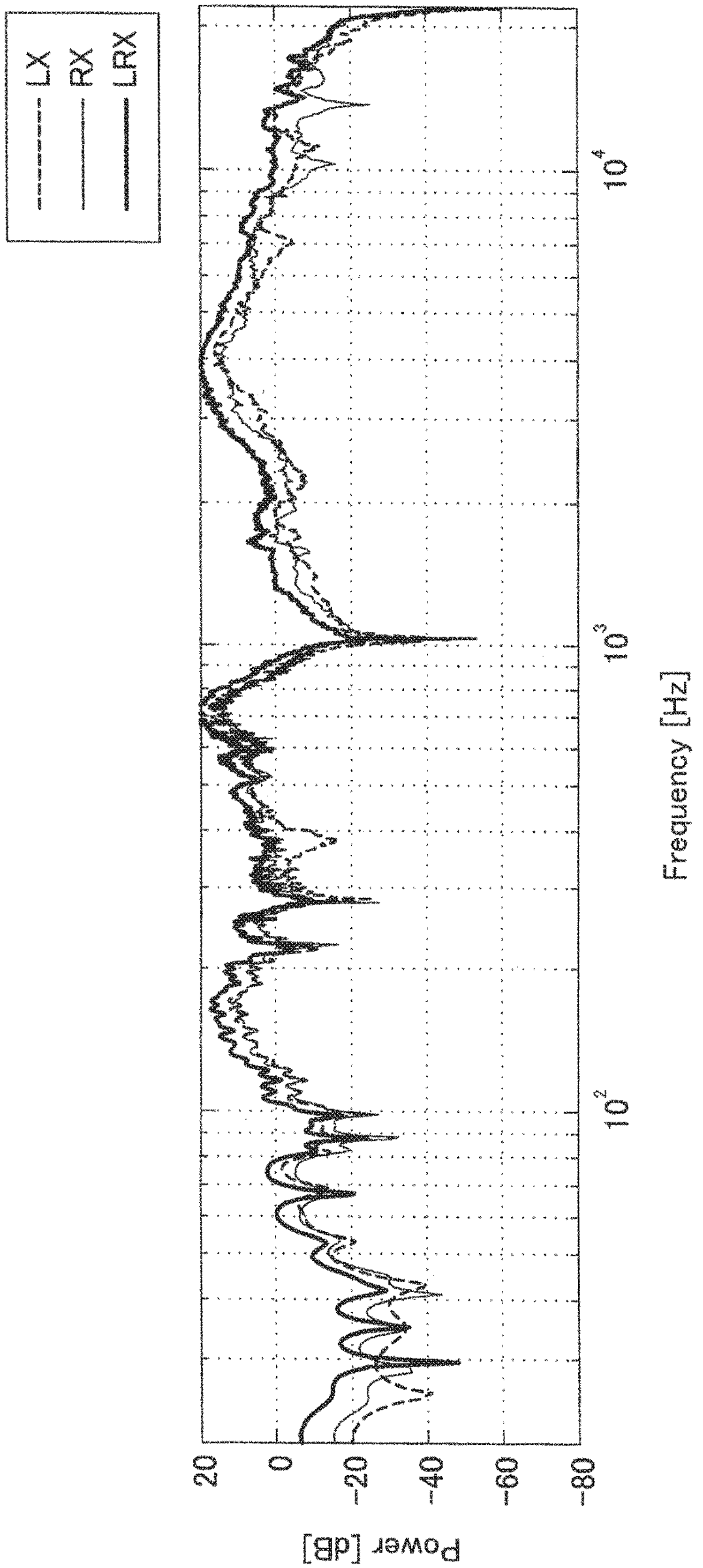
FIG. 10 is a diagram illustrating an acoustic measurement result of an L/R channel.

The amplitude characteristics in the case where sound processing is performed at the sound processing unit 42 will be illustrated in FIG. 9 and FIG. 10 next.

FIG. 9 illustrates an acoustic measurement result (in FIG. 9, LX) in the case where a monaural signal is output from the L channel. FIG. 9 also illustrates a characteristic curve L (FIG. 6) in the case where sound processing is not performed.

As illustrated in FIG. 9, it can be seen that there is no large change in the amplitude characteristics between after sound processing and before sound processing, and sound of a specific frequency band and attenuation of a vibration level are not seen in an output signal after sound processing.

Processing similar to that performed in the L channel is also performed on the R channel. By this means, there is no large change in the amplitude characteristics of the R channel between after sound processing and before sound processing, and attenuation of output levels is suppressed.

FIG. 10 illustrates an acoustic measurement result (in FIG. 10, a sign LRX) in the case where a monaural signal is output from the L/R channel. Furthermore, FIG. 10 also illustrates a characteristic curve LX of the L channel and a characteristic curve RX of the R channel. As illustrated in FIG. 10, it can be seen that interference is reduced by phase delays of the exciters 21L and 21R being corrected in a low frequency band including the piston motion region.

In the present configuration, processing of suppressing a standing wave by inverting a phase in a specific frequency band is not executed. Therefore, it is possible to suppress attenuation of output levels while reducing interference. By this means, it is possible to efficiently reproduce sound and vibration.

As described above, the control device 30 of the present embodiment performs correction processing of correcting phase delay characteristics including transmission systems from the exciters 21L and 21R which are first and second vibrators connected with a rigid body, on the acoustic signals SR and SL by the sound processing unit 42. Thereafter, the control device 30 controls the exciters 21L and 21R on the basis of the corrected acoustic signals SL1 and SR1. By this means, it is possible to suppress attenuation of output levels while reducing interference due to the exciters 21L and 21R and efficiently reproduce sound and vibration.

Moreover, the control device 30 performs the correction processing on a signal which is in a low frequency band and which is a monaural component among the acoustic signals SR and SL. According to this configuration, interference of the piston motion region in which interference is likely to occur is efficiently reduced. By this means, it is possible to clearly reproduce sound and vibration of the monaural component. Furthermore, in the case where a stereo component is included in the acoustic signals SR and SL, the correction processing is not performed on the stereo component. By this means, an effect of maintaining and improving a stereophonic effect (including a reverberant effect) can be also expected.

Furthermore, in the control device 30, the low frequency band separating unit 62 and the high frequency band separating unit 63 function as a separating unit which separates the acoustic signals SR and SL into a signal which is in a low frequency band and which is a monaural component and other signals. Furthermore, the second synthesizing unit 66 functions as an adding unit which adds the signal subjected to the correction processing and the residual signal. The control device 30 then controls the exciters 21L and 21R on the basis of the signal added at the second synthesizing unit 66. By this configuration, it is possible to generate the acoustic signals SL1 and SR1 including the signal which is in a low frequency band and which is a monaural component subjected to the correction processing, so that it is possible to appropriately control the exciters 21L and 21R on the basis of the acoustic signals SL1 and SR1.

Furthermore, the acoustic signals SR and SL have a signal of the L channel (first channel) corresponding to the exciter 21L and a signal of the R channel (second channel) corresponding to the exciter 21R. The control device 30 then acquires impulse responses of the respective exciters 21L and 21R at predetermined positions by the acoustic measuring unit 34, and acquires the correction response XL(ω) which is correction information for the L channel for correcting the phase delay characteristics and the correction response XR(ω) which is correction information for the R channel on the basis of the respective impulse responses. Thereafter, the control device 30 corrects the acoustic signal SL of the L channel on the basis of the correction response XL(ω) and corrects the acoustic signal SR of the R channel on the basis of the correction response XR(ω) as the correction processing. Because correction information of the respective channels is obtained from the respective impulse responses of the respective exciters 21L and 21R in this manner, it is possible to correct the phase delay characteristics with high accuracy.

The above-described embodiment is merely an example of an embodiment of the present invention and can be arbitrarily modified and applied within a scope not deviating from the gist of the present invention.

For example, while, in the above-described embodiment, a case has been described where the correction information (correction responses XR(ω) and XL(ω)) of the respective channels is obtained from the impulse responses obtained through actual measurement, the present invention is not limited to this, the correction information may be obtained from the impulse responses obtained through simulation. In this case, the control device 30 only has to input information of the impulse responses from outside. According to this configuration, it is possible to omit the acoustic measuring unit 34 from the control device 30.

Furthermore, it is not necessary to limit the configuration to a configuration where the correction information is acquired by utilizing the impulse responses. It is also possible to apply other configurations in which the correction information is acquired by utilizing the correction information for correcting the phase delay characteristics.

Furthermore, while, in the above-described embodiment, a case has been described where the correction processing is performed on a signal which is in a low frequency band and which is a monaural component, the configuration does not have to be limited to this configuration. It is also possible to perform the correction processing on a signal including a band other than the low frequency band or a low/mid frequency band or a signal including a stereo component in a range in which attenuation of output levels can be suppressed while interference is reduced.

Furthermore, while, in the above-described embodiment, a case has been described where the exciter 21 is used as a vibrator of the acoustic device 10, the present invention is not limited to this, and it is also possible to widely use a publicly known vibrator.

Furthermore, while, in the above-described embodiment, a case has been described where the present invention is applied to the acoustic device 10 in which the control device 30 and the exciter 21 are integrated, the present invention is not limited to this. For example, it is also possible to employ a configuration where the control device 30 can be separated from a vibration unit including a vibrator such as the exciter 21. Furthermore, the present invention can be applied to the control device 30 in which the vibration unit to be controlled can be changed. Note that, in the above-described embodiment, the exciter 21 and the axial member 23 constitute the main part of the vibration unit.

Furthermore, while, in the above-described embodiment, a case has been described where the acoustic device 10 is also used as the neck pad, the present invention is not limited to this. For example, the acoustic device 10 may be also used as a cushion which supports the waist of the passenger. Furthermore, a position where the acoustic device 10 is disposed is not limited if information can be transmitted to the passenger by the acoustic device 10. For example, it is also possible to employ a configuration where the acoustic device 10 is embedded in a seating face of a seat or employ a configuration where the acoustic device 10 is embedded in a backrest portion of a seat. Furthermore, while, a case has been described by way of example where the present invention is applied to an in-vehicle device (the acoustic device 10 and the control device 30), the present invention is not limited to this, and the present invention may be applied to an acoustic device other than an in-vehicle device.

REFERENCE SIGNS LIST

10 acoustic device
21L, 21R exciter (first and second vibrators)
23 axial member (rigid body)
25 pad portion (member to be vibrated)
30 acoustic control device (control unit)
31 control unit
32 acoustic reproducing unit
33 measurement signal generating unit
34 acoustic measuring unit
41 reproducing unit (acquiring unit)
42 sound processing unit
51A microphone
61 FFT unit
62 low frequency band separating unit (separating unit)
63 high frequency band separating unit (separating unit)
64 phase delay correcting unit
65 first synthesizing unit
66 second synthesizing unit (adding unit)
67 IFFT unit
SR, SL, SL1, SR1, SL2, SR2 acoustic signal
XL(ω) correction response (correction information for a first channel)
XR(ω) correction response (correction information for a second channel)

The invention claimed is:

1. An acoustic device comprising:
a first exciter including a first vibrator and the first exciter vibrating entirely;
a second exciter including a second vibrator and the second exciter vibrating entirely;
a rigid body forming a rod extending in a linear manner, and one end of the rigid body connecting the first exciter and another end of the rigid body connecting the second exciter;
a member to be vibrated through which the rigid body passes; and
a computer,
wherein the computer includes
an acquiring circuit configured to acquire an acoustic signal; and
a control circuit configured to perform correction processing of correcting a phase delay characteristic including transmission systems from the first vibrator and the second vibrator on the acoustic signal and control the first exciter and the second exciter on a basis of the corrected acoustic signal,
wherein the control circuit includes a separating circuit configured to separate the acoustic signal into a signal which is in a low frequency band and which is a monaural component and other signals, and an adding circuit configured to add the signal subjected to the correction processing and the other signals, and control the first exciter and the second exciter on a basis of a signal obtained by addition.

2. The acoustic device according to claim 1,
wherein the control circuit performs the correction processing on a signal which is in a low frequency band and which is a monaural component among the acoustic signal.

3. The acoustic device according to claim 1,
wherein the acoustic signal includes a signal of a first channel corresponding to the first exciter and a signal of a second channel corresponding to the second exciter,
the control circuit includes an acoustic measuring circuit configured to acquire respective impulse responses of the first exciter and the second exciter at predetermined positions, and acquire correction information for the first channel and correction information for the second channel for correcting the phase delay characteristic on a basis of the respective impulse responses, and
as the correction processing, the signal of the first channel is corrected on a basis of the correction information for the first channel, and the signal of the second channel is corrected on a basis of the correction information for the second channel.

4. An acoustic control device which controls a vibration unit including a first vibrator, a second vibrator, a rigid body connecting the first vibrator and the second vibrator, and a member to be vibrated through which the rigid body passes, the acoustic control device comprising:
a computer,
wherein the computer includes
an acquiring circuit configured to acquire an acoustic signal; and
a control circuit configured to perform correction processing of correcting a phase delay characteristic including transmission systems from the first vibrator and the second vibrator on the acoustic signal and control the first vibrator and the second vibrator on a basis of the corrected acoustic signal,
wherein the control circuit includes a separating circuit configured to separate the acoustic signal into a signal which is in a low frequency band and which is a monaural component and other signals, and an adding circuit configured to add the signal subjected to the correction processing and the other signals, and control the first vibrator and the second vibrator on a basis of a signal obtained by addition.

5. An acoustic device comprising:
a first vibrator;
a second vibrator;
a rigid body connecting the first vibrator and the second vibrator;
a member to be vibrated through which the rigid body passes; and
a computer,
wherein the computer includes
an acquiring circuit configured to acquire an acoustic signal;
a control circuit configured to perform correction processing of correcting a phase delay characteristic including transmission systems from the first vibrator and the second vibrator on the acoustic signal and control the first vibrator and the second vibrator on a basis of the corrected acoustic signal, and
wherein the control circuit includes a separating circuit configured to separate the acoustic signal into a signal which is in a low frequency band and which is a monaural component and other signals, and an adding circuit configured to add the signal subjected to the correction processing and the other signals, and control the first vibrator and the second vibrator on a basis of a signal obtained by addition.

* * * * *